United States Patent [19]
Watanabe

[11] Patent Number: 5,342,235
[45] Date of Patent: Aug. 30, 1994

[54] MEAT PROCESSING MACHINE
[75] Inventor: Yasushi Watanabe, Hokkaido, Japan
[73] Assignee: Nikko Tokki Co., Ltd., Tokyo, Japan
[21] Appl. No.: 971,578
[22] Filed: Nov. 5, 1992
[51] Int. Cl.$^5$ ............................................. A22C 9/00
[52] U.S. Cl. ..................................... 452/141; 99/532
[58] Field of Search ................... 452/141; 83/691; 99/532

[56] References Cited
U.S. PATENT DOCUMENTS

| | | | |
|---|---|---|---|
| 3,535,734 | 10/1970 | Ross | 452/141 |
| 3,583,025 | 6/1971 | Jaccard | 452/141 |
| 3,727,267 | 4/1973 | Clark | 452/141 |
| 3,736,623 | 6/1973 | O'Malley et al. | 452/141 |
| 3,842,464 | 10/1974 | McCord | 452/141 |
| 3,991,439 | 11/1976 | Wagner | 452/141 |
| 4,027,356 | 6/1977 | Wagner et al. | 452/141 |
| 4,055,872 | 11/1977 | Wagner | 452/141 |
| 4,086,683 | 5/1978 | Davis et al. | 452/141 |
| 4,186,462 | 2/1980 | Bettcher | 452/141 |
| 4,199,841 | 3/1980 | Jaccard | 452/141 |
| 4,205,414 | 6/1980 | Ueno et al. | 452/141 |
| 4,287,642 | 9/1981 | Jaccard et al. | 452/141 |
| 4,463,476 | 8/1984 | Jaccard | 452/141 |

Primary Examiner—Willis Little
Attorney, Agent, or Firm—Sughrue, Mion, Zinn, Macpeak & Seas

[57] ABSTRACT

A meat processing machine comprises: a movable stand movable on a base stand with a block of meat set on it; a supporting stand provided above the base stand in such a manner as to be vertically movable; needle connecting members coupled to the supporting stand, the needle connecting members being arranged in a direction perpendicular to a direction of movement of the movable stand; a number of needles extended downwardly from each of the needle connecting members; lift drive means provided between the supporting stand and the needle connecting members, for lifting the needle connecting members to predetermined positions separately so that the needles of a selected one or ones of the needle connecting members are inserted into the block of meat; and a reciprocation drive means for moving the supporting stand vertically, for the purpose of cutting the sinews in the block of meat suitably which are not always uniformly distributed in it.

6 Claims, 7 Drawing Sheets

MEAT PROCESSING MACHINE

BACKGROUND OF THE INVENTION

This invention relates to a meat processing machine for cutting sinews in meat.

A meat processing machine is well known in the art with which meat such as beef and pork is made soft by cutting the sinews in it. The meat processing machine includes: a base stand; a movable stand which is movable on the base stand forwardly; one needle connecting member provided above the passageway of the movable stand; a number of needles extended downwardly from the needle connecting member; and a crank mechanism for reciprocating the needle connecting member vertically.

In the meat processing machine, the needle connecting member with the needles is moved up and down with a predetermined period, while the movable stand, on which a block of meat is set, is intermittently moved in the forward direction with a predetermined pitch. That is, when the movable stand is stopped, the needle connecting member is moved downwardly, towards the movable stand, so that the needles are inserted into the block of meat, to cut the sinews in it.

In the conventional meat processing machine, as was described above, the needle connecting member with the needles is moved up and down with a predetermined period, while the movable stand, on which a block of meat is set, is intermittently moved in the forward direction with a predetermined pitch. Hence, it is impossible for the machine to suitably cut the sinews in the block of meat which are not always uniform in distribution in it depending on the kind or location of the meat. As was described above, with the conventional meat processing machine, the needles are uniformly inserted into the block of meat with the predetermined pitch. Hence, in the case where a block of meat in which sinews are distributed non-uniformly is processed with the machine, the block of meat thus processed has a part or parts in which the number of times of insertion of the needles is not adequate, and a part or parts in which the number of times of insertion of the needles is adequate; that is, the resultant block of meat is unsatisfactory in quality.

SUMMARY OF THE INVENTION

Accordingly, an object of this invention is to eliminate the above-described difficulty accompanying a conventional meat processing machine.

The foregoing object and other objects of the invention have achieved by the provision of a meat processing machine which, according to the invention, comprises: a base stand; a movable stand movable on the base stand with a block of meat set on it; a supporting stand provided above the base stand in such a manner that the supporting stand is vertically movable; a plurality of needle connecting members coupled to the supporting stand, the needle connecting members being arranged in a direction perpendicular to a direction of movement of the movable stand; a number of needles extended downwardly from each of the needle connecting members; lift drive means provided between the supporting stand and the needle connecting members, for lifting the needle connecting members to predetermined positions separately so that the needles of a selected one or ones of the needle connecting members are inserted into the block of meat; and a reciprocation drive means for moving the supporting stand vertically.

In the machine, first, the movable stand is positioned at the rear end of the base stand, and a block of meat is set on the movable stand, and the supporting stand is positioned at the top dead center. Under this condition, horizontal drive means operated to move the movable stand forwardly/backwardly. When the end portion of the block of meat comes below the needles, the horizontal drive means is stopped temporarily, and the reciprocation drive means is operated to lower the supporting stand. As the supporting stand moves downwardly in this manner, the needles together with the connecting members and are moved downwardly and inserted into the block of meat to cut the sinews, reaching the bottom dead center. Thereafter, the supporting stand, the needle connecting members, and the needles are moved upwardly to the respective top dead centers. When the supporting stand has reached the top dead center, the horizontal drive means is operated again to move the movable stand a predetermined distance forwardly/backwardly. That is, while the movable stand is intermittently moved in the forward/backward direction, the reciprocation drive means is operated with a predetermined period, so that the sinews in the block of meat are cut with the needles at suitable intervals.

In cutting the block of meat, of the needle connecting members, one or ones which confront a part of the block of meat which possess fewer sinews are raised by the reciprocation drive means in advance. Therefore, only the remaining needle connecting members are moved sufficiently downwardly, and the needles thereof are inserted into the block of meat to cut the sinews. That is, the needles are inserted only into the sinewly part of the block of meat, to cut the sinews. The block of meat thus processed is high in quality as a whole.

The nature, principle, and utility of the invention will be more clearly understood from the following detailed description of the invention when read in conjunction with the accompanying drawings.

DETAILED DESCRIPTION OF THE INVENTION

One preferred embodiment of this invention will be described with reference to the accompanying drawings.

Figure 5:
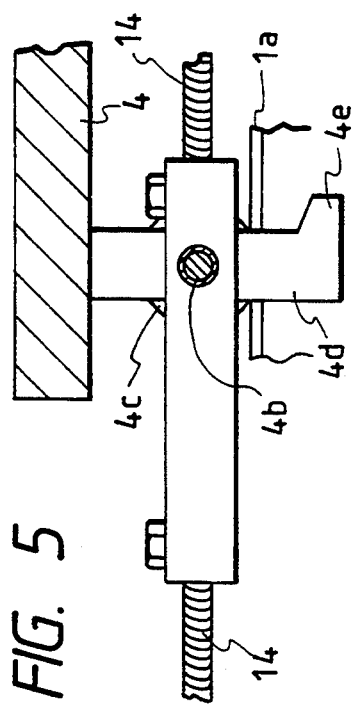
FIGS. 5 and 6 are a side view and a front view, with parts cut away, showing essential parts of a movable stand in the machine of the invention.
Figure 6:
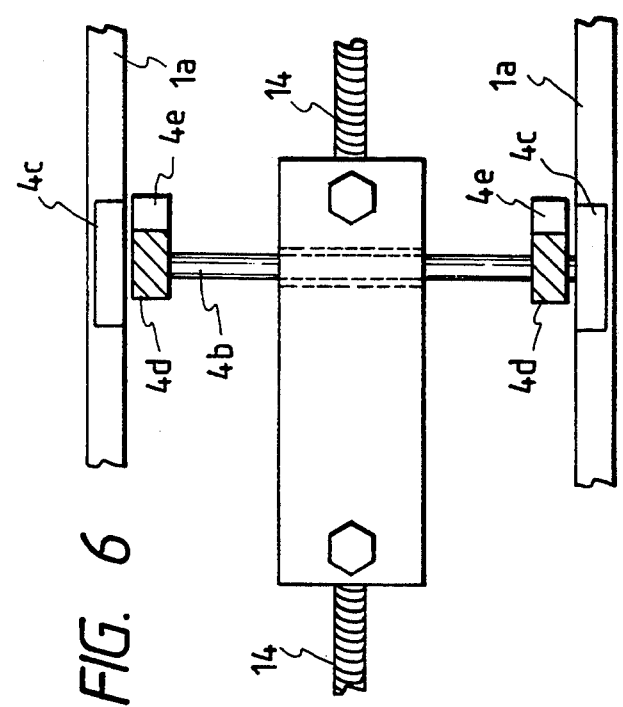

One example of a meat processing machine according to the invention is as shown in FIGS. 1 through 14. In those figures, reference numeral 1 designates a base stand, which is set on a foundation 3 through a plurality of supports 2. A movable stand 4 is provided on the base stand 1 in such a manner that it is movable back and forth (right and left in FIG. 1). As shown in FIGS. 5 and 6, The movable stand 4 has a front shaft, on which a pair of front wheels 4a are rotatably mounted, and a rear shaft 4b, on which a pair of rear wheels 4c are rotatably mounted. The front and rear wheels 4a and 4c are rolled on rails 1a provided on the base stand 1. The rear shaft 4b is secured to the movable stand 4 through a pair of brackets 4d. The brackets 4d have hooks 4e extended downwardly. When the movable stand 4 is moved to the front end of the base stand 1, the hooks 4e are engaged with a supporting shaft 10a, which supports a pulley 10 (described later), and the movable stand 4 is inclined forwardly to cause a block of meat 48 to drop from it into a carriage 50.

The movable stand 4 is moved back and forth on the base stand 1 by horizontal drive means 5 provided on the lower surface of the base stand 1. The horizontal drive means 5 comprises: a servo motor 6 which is rotatable in a forward direction and in a reverse direction; a drum 8 rotatably supported on the lower surface of the base stand 1; a reduction gear unit 7 through which the rotation of the servo motor 6 is transmitted to the drum; pulleys 10 and 12 which are rotatably supported on the base stand 1 at the front and rear ends, respectively, and a wire 14 laid over the pulleys 10 and 12 and wound on the drum 8. Both ends of the wire 14 are tied to the rear shaft 4b of the movable stand 4. When the servo motor 6 is rotated in the forward direction or in the reverse direction, the rotation of the servo motor 6 is transmitted through the reduction gear unit 7 to the drum 8, so that the movable stand 4 connected to the wire 14 is moved on the base stand 1 forwardly or backwardly.

A pair of guide bars 16, and a pair of guide bars 18 are set vertical on both sides of the front portion of the base stand 1, respectively. Cylindrical guide members 20 are mounted on the guide bars 16, respectively, in such a manner that the former are movable vertically along the latter. Similarly, cylindrical guide members 22 are mounted on the guide bars 18, respectively, in such a manner that the former are movable vertically along the latter. These cylindrical guide members 20 and 22 support a supporting stand 24 at four corners. The supporting stand 24 is movable vertically with the guide members 20 and 22 being guided by the guide bars 16 and 18.

The supporting stand 24 has a plurality of needle connecting members 26, 27, 28 and 29 set respectively through lift drive means 32. Each of the lift drive means 32 is made up of a double action air pressure cylinder unit. The cylinders 32a of the units are secured to the supporting stand 24, and the ends of the piston rods 32b are coupled to the needle connecting members 26, 27, 28 and 29, respectively. In each of the cylinders 32a, the upper and lower chambers are supplied with compressed air from a compressed air source (not shown) so as to reciprocate the piston rod 32b. Thus, the needle connecting members 26 through 29 coupled to the piston rods 32b can be lifted (moved) to predetermined positions separately.

Figure 2:
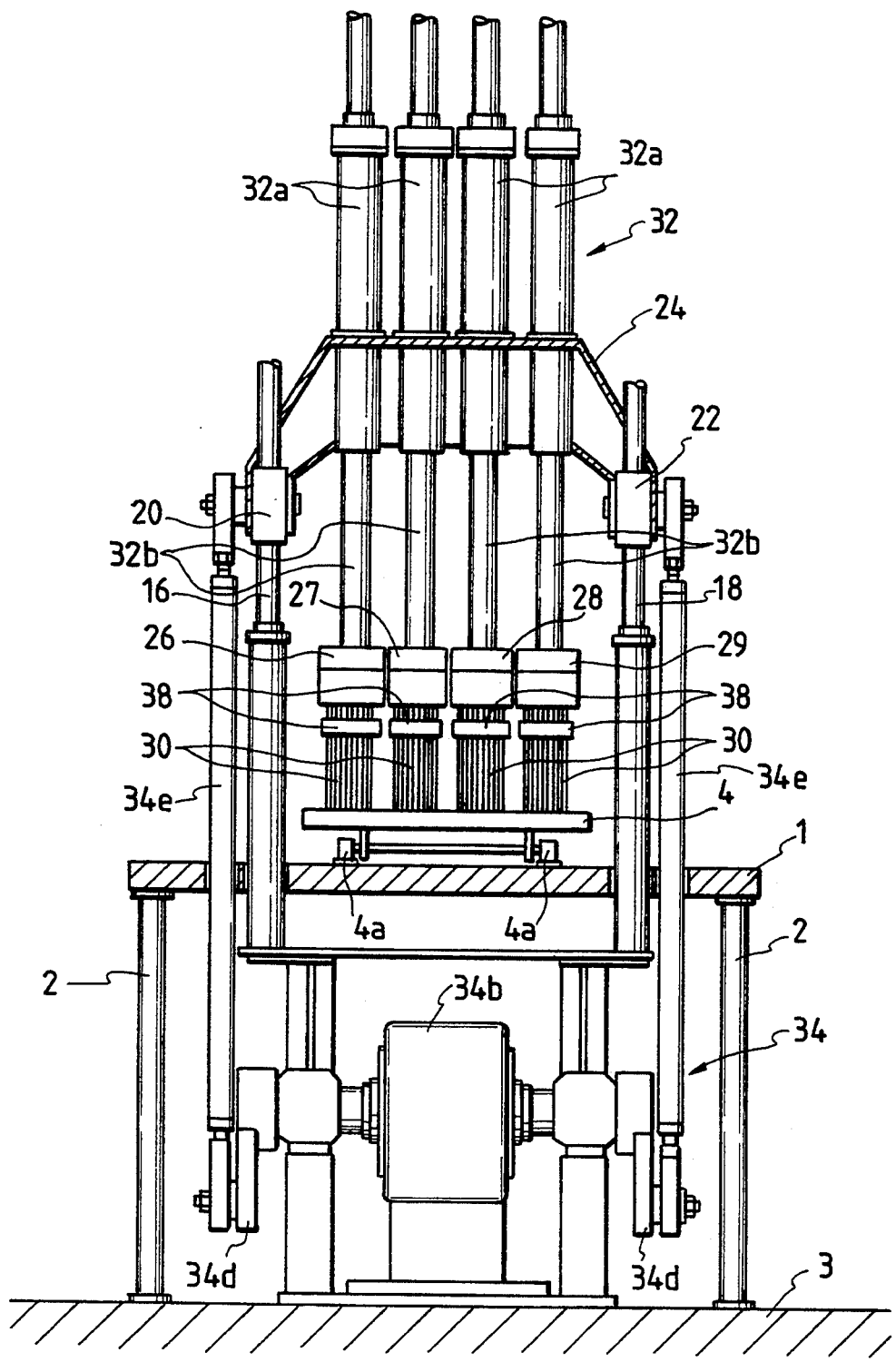
Figure 4:
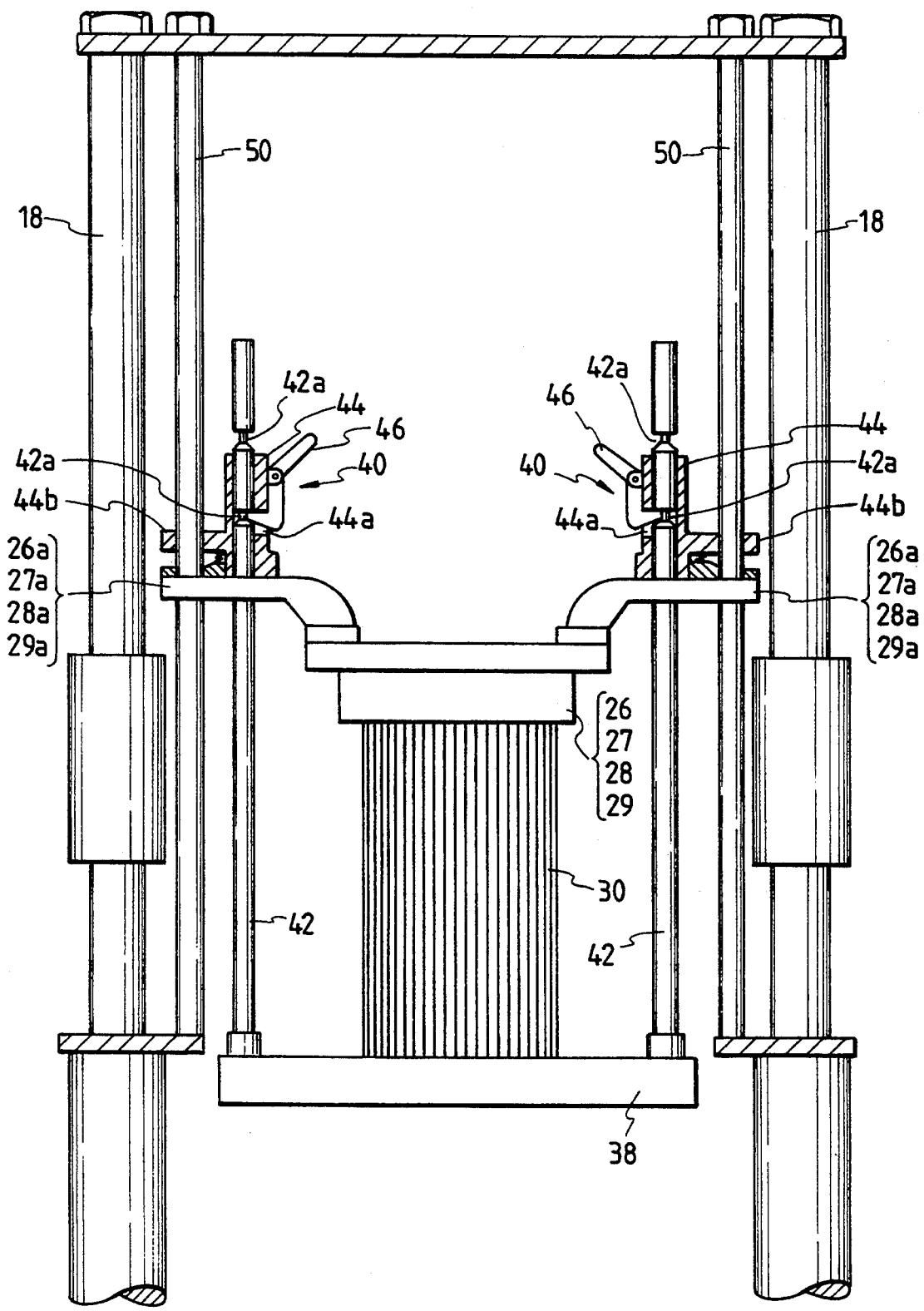
FIG. 4 is a side view, with parts cut away, showing adjusting mechanisms in the machine of the invention.
Figure 7:
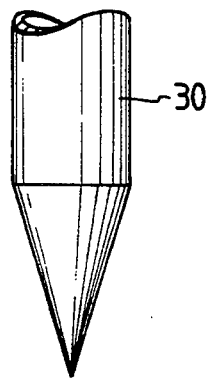
FIGS. 7 and 8 are a side view and a front view, showing an essential part of a needle in the machine of the invention.
Figure 8:
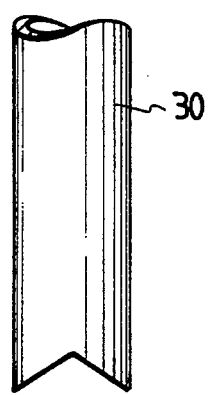

In the embodiment, as shown in FIG. 2, four needle connecting members 26 through 29 are aligned in a direction perpendicular to the direction of movement of the movable stand 4. Each of the needle connecting members 26 has a number of needles 30, as one unit, which are extended downwardly. Thus, by controlling the operations of the lift drive means 32, a selected one or ones of the needle connecting members 26 through 29 can be activated so that their needles 30 are inserted into the block of meat 48. The needle connecting members 26, 27, 28 and 29, as shown in FIG. 4, have front and rear arms 26a and 26a, 27a and 27a, 28a and 28a, and 29a and 29a, respectively, which are slidably engaged with guide bars 50 (described later) so that the needle connecting members are held stable in posture. Each of the needles 30 is shaped as shown in FIGS. 7 and 8. That is, as shown in FIG. 7, the needles 30 is flattened at the end to have a sharp edge, and the sharp edge, as shown in FIG. 8, is recessed at the middle to receive sinews with ease.

Figure 3:
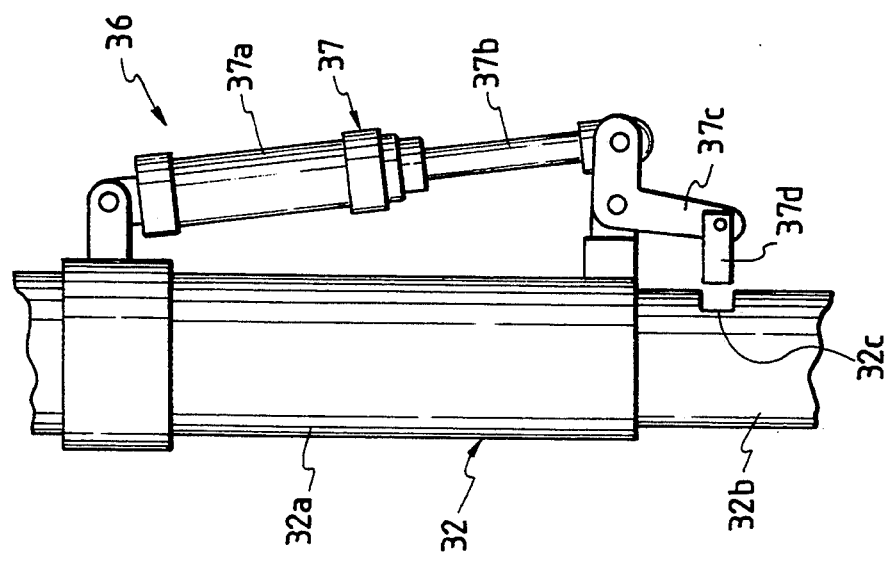
FIG. 3 is a side view of lock means in the machine of the invention.

The upper positions of the needle connecting members 26 through 29 can be fixed by lock means 36 provided respectively for the cylinders 32a. Each of the lock means 36, as shown in FIG. 3, comprises: a double action type locking air pressure cylinder unit with its locking cylinder 37a swingably coupled through a pin to the outer wall of the cylinder 32a; a bell crank 37c having its one end portion coupled through a pin to the end of the piston rod 37b of the locking air pressure cylinder unit 37 and its middle portion coupled through a pin to the outer wall of the lower end portion of the cylinder 32a; and a protrusion 37d secured to the other end portion of the bell-crank 37c. When compressed air is supplied into the upper chamber of the locking cylinder 37a, the piston rod 37b is moved outwardly to swing the bell-crank 37c, so that the protrusion 37d is allowed to engage with one of a plurality of recesses 31c formed in the piston rod 32b of the lift drive means 32; that is, the amount of protrusion of the piston rod 32b can be fixed. When compressed air is supplied into the lower chamber of the locking cylinder 37a, the protrusion 37d is disengaged from the recess 32c.

Figure 1:
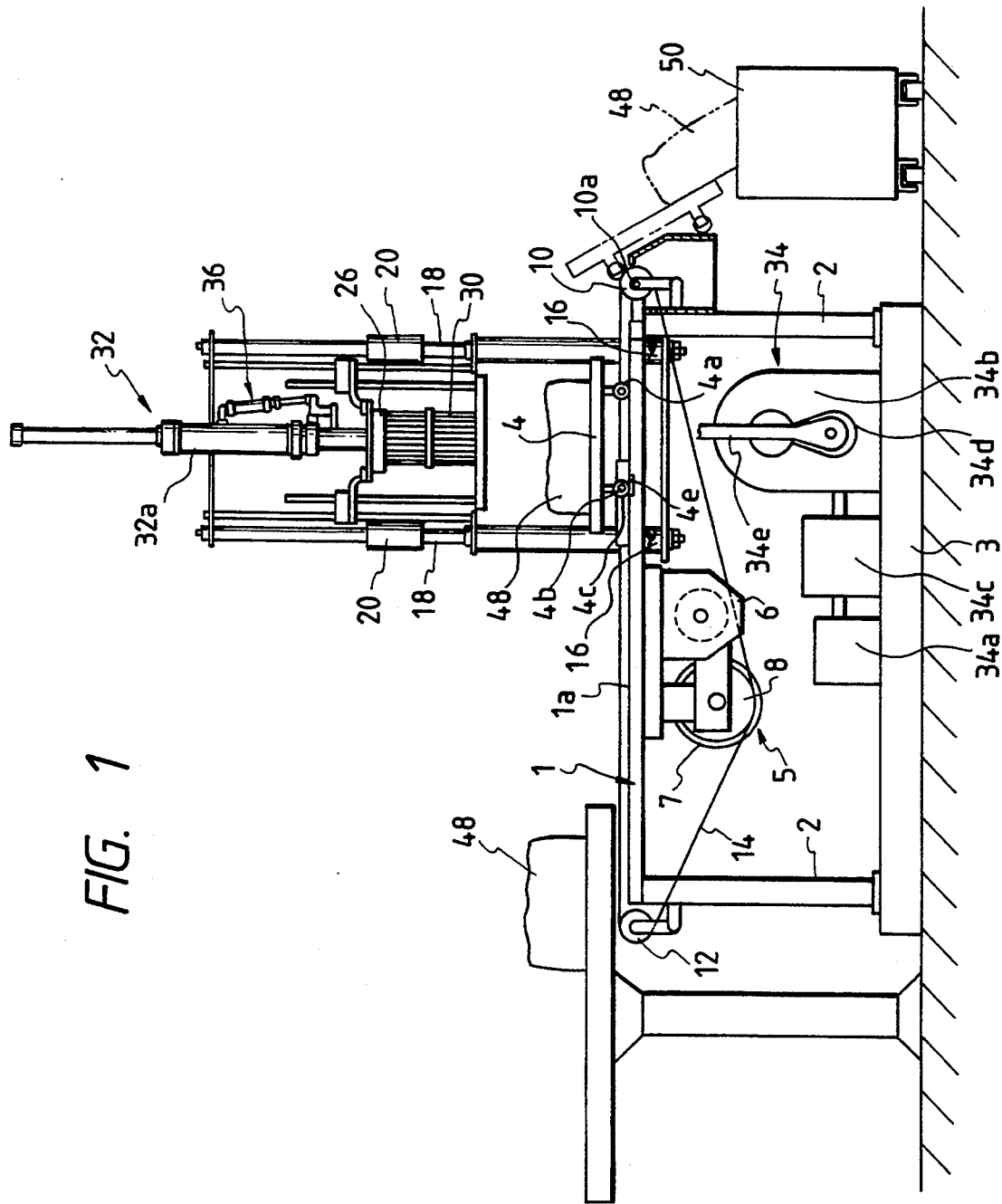
FIGS. 1 and 2 are a front view and a side view, with parts cut away, showing a meat processing machine according to this invention.

The supporting stand 24 is provided with reciprocation drive means 34 for reciprocating it vertically. In the embodiment, the reciprocation drive means 34 is made up of a crank mechanism as shown in FIGS. 1 and 2. The reciprocation drive means 34 comprises: a rotary drive source 34a which is rotated at all times; a reduction gear unit 34b; a clutchbrake unit 34c interposed between the rotary drive source 34a and the reduction gear unit 34b, to control transmission of the drive force of the rotary drive source 34a and to brake the latter 34a; a pair of cranks 34d arranged on both sides of the reduction gear unit 34b, the cranks being rotated at a speed reduced by the reduction gear unit 34b; and connecting rods 34e each of which has its lower end portion rotatably coupled through a pin to the respective crank 34d, and its upper end portion swingably coupled through a pin to the supporting stand 24.

As the rotary drive source 34a is rotated, the drive force thereof is transmitted through the clutch-brake unit 34c and the reduction gear unit 34b to the pair of cranks 34d, so that the supporting stand 24 being guided by the guide bars 16 and 18 is moved smoothly upwardly from the bottom dead center (as shown in FIG. 2) through the pair of connecting rods 34e. When the supporting stand 24 has reached the top dead center, the clutch of the clutch-brake unit 34c is disconnected, and the brake is activated thereby to hold the supporting stand at the upper position. When, under this condition, the clutch of the clutch-brake unit 34c is connected, and the brake is released, then the supporting stand 24 is moved downwardly to the bottom dead center.

The needle connecting members 26, 27, 28 and 29 have meat retaining boards 38, respectively, in which a number of small holes are formed into which the needles 30 are inserted. As shown in FIG. 4, adjusting mechanisms 40 are provided to adjust the heights of the meat retaining boards 38 with respect to the needle connecting members 26, 27, 28 and 29, and accordingly to the needles 30. As shown in FIG. 4, the meat retaining boards 38 with the needles 30 are locked to the front and rear arms 26a and 26a, 27a and 27a, 28a and 28a, and 29a and 29a of the needle connecting members 26, 27, 28 and 29 with the aid of pairs of supporting bars 42 and cylindrical members 44, respectively. Each of the cylindrical members 44 has an opening 44a, and a lever 46 with a pawl with its middle portion coupled through a pin to it. Each of the supporting bar 42 has a plurality of annular grooves at predetermined intervals in its axial direction.

The pawl of the lever 46 is inserted into the opening 44a, and locked to a desired one of the annular grooves 42a, so that the cylindrical member 44 is fixedly mounted on the upper end portion of the supporting bar 42. Thus, with the cylindrical members 44 on the upper surfaces of the needle connecting members' arms 26a, 27a, 28a and 29a, the heights of the meat retaining boards 38 with respect to the needles 30 can be adjusted. The cylindrical members 44 have arms 44b, respectively, which are slidably mounted on the guide bars 50 which are held in parallel with the guide bars 16 and 18, so that the supporting bars 42 and accordingly the meat retaining boards 38 are held stable in posture. As described above, it is obvious to those skilled in the art that the adjusting mechanisms 40 are suitable to adjusting the heights of the meat retaining boards 38 with respect to the needle connecting members 26, 27, 28 and 29, and accordingly to the needles 30.

The operation of the meat processing machine thus constructed will be described.

First, the movable stand 4 is positioned at the rear end of the base stand 1 (the left end in FIG. 1), and a block of meat 48 such as beef or pork is set on it. The supporting stand 21 is at the top dead center, and is held there by means of the clutch-brake unit 34c. Under this condition, the horizontal drive means 5 is operated to move the movable stand 4 forwardly with the aid of the wire 14. When the block of meat 48 comes below the needles 30, the drive means 5 is stopped temporarily. Thereafter, the clutch-brake unit 34c is so controlled that the reciprocation drive means 34 is activated to move the supporting stand 24 downwardly. As the supporting stand 24 is moved downwardly in this manner, the meat retaining boards 38 are abutted against the upper surface of the block of meat 48, so that the downward movement of them is stopped. As the supporting stand is further moved downwardly, the needle connecting members 26 through 29 and the needles 30 are moved downwardly together with it, so that the needles 30 are inserted into the block of meat 48 to cut the sinews, and the supporting stand reaches the bottom dead center. In this operation, the arms 26a, 27a, 28a and 29a are slid on the supporting bars 42.

Thereafter, the supporting stand 24, the needle connecting members 26, 27, 28 and 29, and the needles 30 are returned upwardly, to the respective top dead centers, by the reciprocation drive means 34. After the needle connecting members 26, 27, 28 and 29 are lifted to the predetermined positions, the cylindrical members 44 are locked to the arms 26a, 27a, 28a and 29a, and therefore the meat retaining boards 38 are also returned upwardly to the original positions. When the supporting stand 24 has reached the top dead center, the clutch-brake unit 34c is so controlled that, with the supporting stand 24 held at the upper position, the drive means 5 is operated to move the movable stand 4 a predetermined distance forwardly. That is, while the movable stand 4 is intermittently moved, the reciprocation drive means 34 is driven with a predetermined period, so that the sinews in the block of meat 48 are cut at intervals.

In cutting the block of meat 48, of the needle connecting members 26, 27, 28 and 29, one or ones which confront a part of the block of meat 48 which has fewer sinews may be raised by the reciprocation drive means 34 in advance; for instance, in FIG. 2 the two leftmost needle connecting members 26 and 27 may be raised in advance. In this case, only the remaining two needle connecting members 28 and 29 are moved sufficiently downwardly; that is, the needles 30 thereof are inserted into the block of meat 48 to cut the sinews. The predetermined upper positions of the needle connecting members 26, 27, 28 and 29 are fixed with the respective cylinders 32a with the aid of the lock means 36. That is, the needles 30 are inserted only into the sinewy part of the block of meat 48, to cut the sinews. The block of meat 48 thus processed is high in quality as a whole.

After the sinews in the block of meat 48 have been cut in this way, the horizontal drive means 5 is operated to move the movable stand 4 forwardly with the aid of the wire 14. When the movable stand 4 reaches the front end of the base stand 4, the hooks 4e are engaged with the supporting shaft 10a, so that the movable stand 4 is inclined forwardly to cause the block of meat 48 to drop into the carriage 50.

An operation of changing the position of insertion of the needles by the horizontal drive means 5 is, for instance, as shown in FIGS. 9 through 14, in which the arrow A indicates a direction of movement of the movable stand 4.

Figure 9:
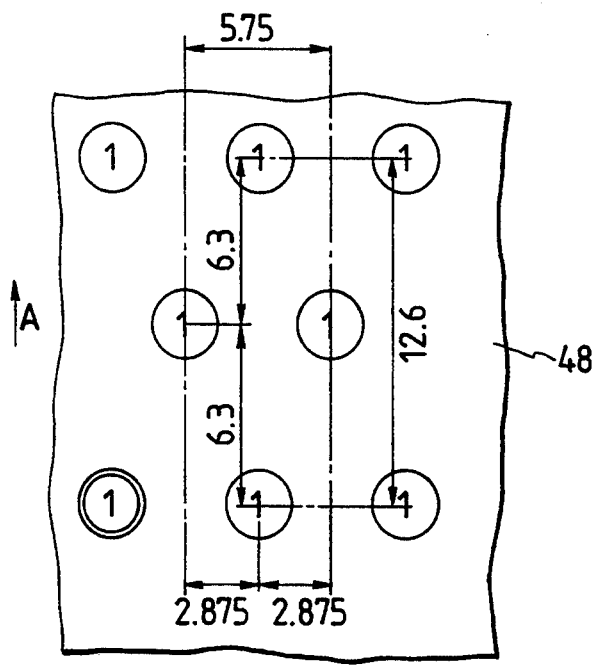
FIGS. 9 through 14 are explanatory diagrams showing one example of the insertion of the needles into a block of meat with the machine of the invention.

FIG. 9 shows the first needle drop positions (1) where the needles 30 are dropped firstly by the operation of the reciprocation drive means 34. As shown in FIG. 9, the needles 30 are positioned on (phantom) straight lines perpendicular to the direction of movement A at intervals of 5.75 mm, which lines are spaced 6.3 mm from one another. Therefore, a needle 30 on any one of the straight lines is spaced 2.875 mm (=5.75 mm/2), in a direction perpendicular to the direction of movement A, from a needle 30 which is adjacent to the needle 30 in the direction of movement A. In this case, the needles 30 are 2.5 mm in diameter.

Figure 10:
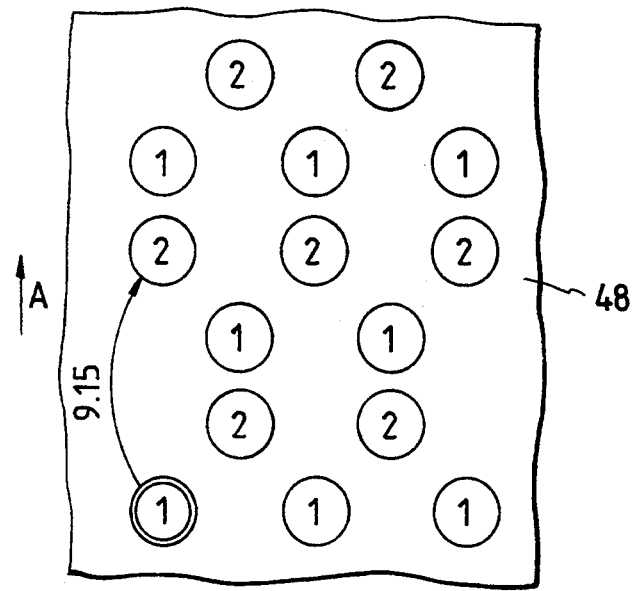

FIG. 10 shows, in addition to the above-described first needle drop positions (1), the second needle drop positions (2) where the needles 30 are secondly dropped after the movable stand 4 is moved by 9.45 mm backwardly by the horizontal drive means 5 from its position corresponding to the first needle drop positions (1).

Figure 11:
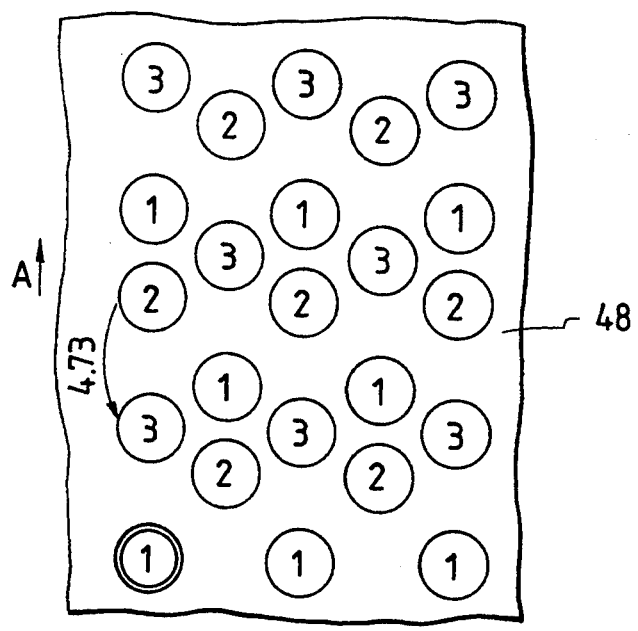

FIG. 11 shows, in addition to the above-described first needle drop positions (1) and second needle drop positions (2), the third needle drop positions (3) where the needles 30 are thirdly dropped after the movable stand is moved 4.73 mm forwardly from its position corresponding to the second needle drop positions (2).

Figure 12:
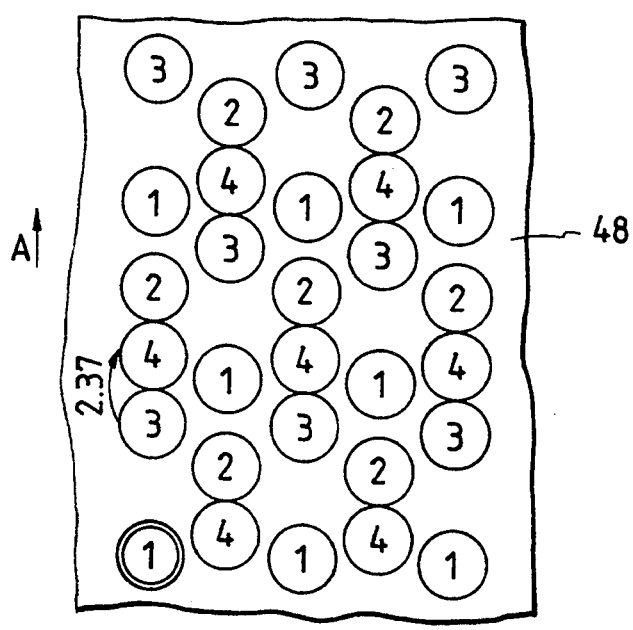

FIG. 12 shows, in addition to the first, second and third needle drop positions (1), (2) and (3), the fourth needle drop positions (4) where the needles 30 are dropped fourthly after the movable stand 4 is moved 2.37 mm backwardly from its position corresponding to the third needle drop positions (3).

Figure 13:
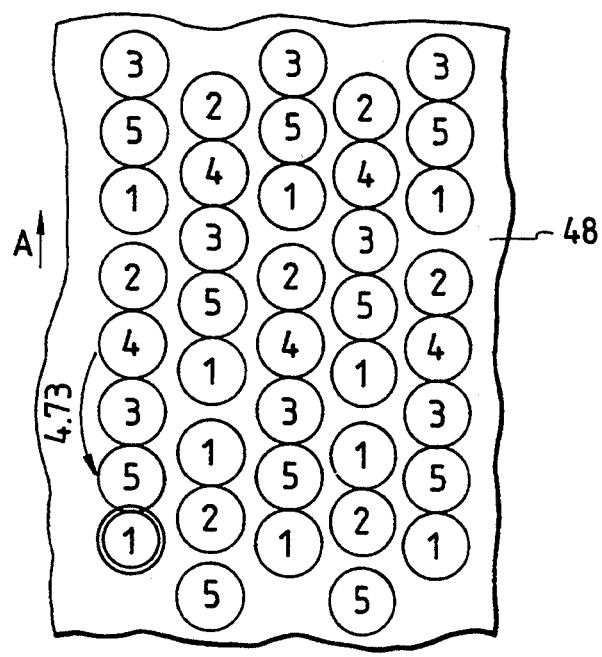

FIG. 13 shows, in addition to the first through fourth needle drop positions (1) through (4), the first needle drop positions (5) where the needles are dropped fifthly after the movable stand 4 is moved 4.73 mm forwardly from its position corresponding to the fourth needle drop positions (4).

Figure 14:
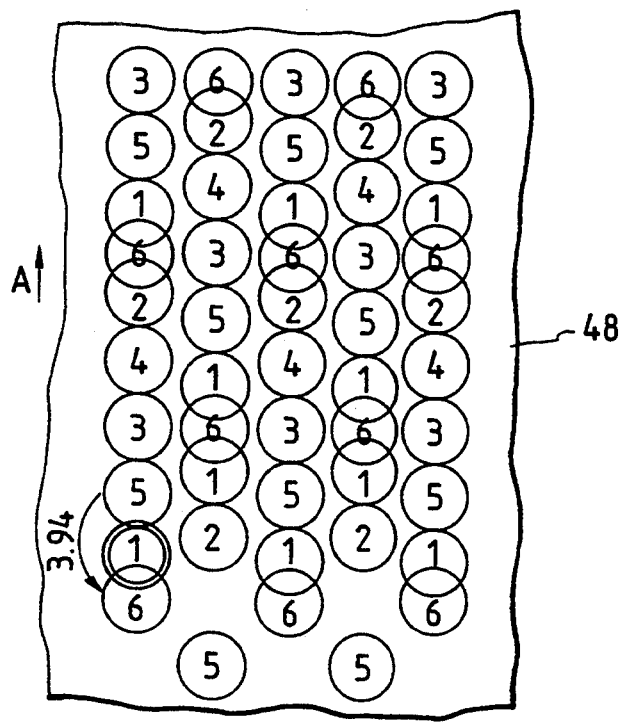
Figure 15:
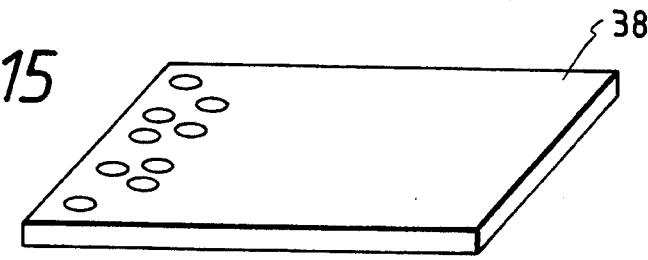
FIG. 15 is showing a plan view of one example of a meat retaining board of the present invention.

FIG. 14 shows, in addition to the first through fifth needle drop positions (1) through (5), the sixth needle drop positions (6) where the needles 30 are dropped after the movable stand 4 is moved 3.94 mm forwardly from its position corresponding to the fifth needle drop positions (5).

That is, as the servo-motor 6 of the horizontal drive means 5 is driven in the forward direction and in the reverse direction, the needles 30 are allowed to drop between the needle drop positions, whereby the sinews of the block of meat 48 can be cut into considerably small pieces.

As was described above, with the meat processing machine of the invention, a plurality of needle connecting members are arranged in the direction perpendicular to the direction of movement of the movable stand, and the needles of a selected one or ones of the needle connecting members are inserted into a block of meat to cut the sinews. Therefore, even though the sinews are not uniform in distribution in the block of meat, they can be cut suitably. That is, in a block of meat, the sinews are not always uniform in distribution, depending on the kind or location of the meat; however, with the machine of the invention, the sinews can be cut suitably, so that the meat thus processed is satisfactory in quality.

While there has been described in connection with the preferred embodiment of this invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A meat processing machine comprising:
    a base stand;
    a movable stand movable on said base stand with a block of meat set thereon;
    a supporting stand provided above said base stand in such a manner that said supporting stand is vertically movable;
    a plurality of needle connecting members coupled to said supporting stand, said needle connecting members being arranged in a direction perpendicular to a direction of movement of said movable stand;
    a plurality of needles extended downwardly from each of said needle connecting members;
    first reciprocating means for reciprocating at least one of said needle connecting members in a direction perpendicular to a direction of movement of said movable stand;
    second reciprocating means for reciprocating said supporting stand in said direction perpendicular to said direction of movement of said movable stand; and
    horizontal drive means for selectively driving said movable stand horizontally forwards and backwards, said horizontal drive means provided on a lower surface of said base stand.

2. A meat processing machine as claimed in claim 1, wherein said first reciprocating means reciprocates said needle connecting member which is selected from at least one of said needle connecting members to position said needle connecting member into a predetermined position, said needle connecting members being individually controllable.

3. A meat processing machine as claimed in claim 1, wherein said horizontal drive means selectively drives said movable stand back and forth intermittently.

4. A method for processing a meat, comprising the steps of:
    horizontally moving said meat set on a movable stand selectively back and forth by horizontal driving means;
    selectively reciprocating a plurality of needle connecting members each having a plurality of needles in a direction perpendicular to a direction of a movement of said movable stage, said needle connecting member being reciprocated by reciprocating means; and
    sticking said needles provided on said needle connecting member which is selected from a plurality of said needle connecting members into a predetermined position of said meat, individually controlling said needle connecting members, to obtain said meat having a constant tenderness.

5. A meat processing machine according to claim 1, further comprising a plurality of meat retaining boards, each of said meat retaining boards supported on each of said needle connecting members respectively, for holding said meat in place, wherein said needles pass through holes formed in said meat retaining boards, and wherein a height of each of said meat retaining boards is individually adjustable.

6. A meat processing machine according to claim 1, wherein said needle connecting members are each provided with locking means, for preventing each of said needle connecting members from being moved towards said meat, respectively.

* * * * *